United States Patent
Tanaka

(10) Patent No.: US 10,923,990 B2
(45) Date of Patent: Feb. 16, 2021

(54) EXTERNAL UNIT AND MOTOR

(71) Applicant: MINEBEA MITSUMI Inc., Nagano (JP)

(72) Inventor: Makoto Tanaka, Kurayoshi (JP)

(73) Assignee: MINEBEA MITSUMI INC., Nagano (JP)

( * ) Notice: Subject to any disclaimer, the term of this patent is extended or adjusted under 35 U.S.C. 154(b) by 349 days.

(21) Appl. No.: 15/962,042

(22) Filed: Apr. 25, 2018

(65) Prior Publication Data
US 2018/0316249 A1   Nov. 1, 2018

(30) Foreign Application Priority Data

Apr. 27, 2017  (JP) .................... 2017-088147

(51) Int. Cl.
| | |
|---|---|
| *H02K 11/25* | (2016.01) |
| *H02K 23/04* | (2006.01) |
| *H02K 5/14* | (2006.01) |
| *H01C 1/14* | (2006.01) |
| *H01C 1/01* | (2006.01) |
| *H01C 7/02* | (2006.01) |

(52) U.S. Cl.
CPC .......... *H02K 11/25* (2016.01); *H01C 1/1406* (2013.01); *H02K 5/145* (2013.01); *H02K 23/04* (2013.01); *H01C 1/01* (2013.01); *H01C 7/02* (2013.01)

(58) Field of Classification Search
CPC ........ H02K 11/25; H02K 5/145; H02K 23/04; H01C 1/01; H01C 7/02; H01C 1/1406
See application file for complete search history.

(56) References Cited

U.S. PATENT DOCUMENTS

| | | | | |
|---|---|---|---|---|
| 5,760,676 | A  * | 6/1998  | Yamada | H01C 1/1406 |
| | | | | 337/183 |
| 6,300,696 | B1 * | 10/2001 | Wong | H02K 5/145 |
| | | | | 310/239 |
| 2005/0258691 | A1 * | 11/2005 | Furuki | H02K 5/145 |
| | | | | 310/89 |
| 2008/0211331 | A1 * | 9/2008  | Dubuc | H02K 19/365 |
| | | | | 310/71 |
| 2010/0181853 | A1 * | 7/2010  | Wong | H02K 11/215 |
| | | | | 310/72 |
| 2010/0270879 | A1   | 10/2010 | Matsushita | |
| 2011/0140554 | A1 * | 6/2011  | Wong | H02K 1/17 |
| | | | | 310/72 |

FOREIGN PATENT DOCUMENTS

JP    2009-165209 A    7/2009

* cited by examiner

*Primary Examiner* — Naishadh N Desai
(74) *Attorney, Agent, or Firm* — Pearne & Gordon LLP

(57) ABSTRACT

In accordance with one aspect of the present disclosure, an external unit used by being mounted on a bottom part of a motor body having at least two motor terminals has a holder, a PTC thermistor arranged on the holder, a first terminal connected to the PTC thermistor, a part of the first terminal exposed to an outside of the holder, and a second terminal electrically connected to the first terminal through the PTC thermistor and electrically connected to one of the motor terminals. The PTC thermistor is flat-plate shaped, and a surface of the PTC thermistor is directed toward a rotary shaft direction of the motor.

12 Claims, 13 Drawing Sheets

EXTERNAL UNIT AND MOTOR

CROSS REFERENCE TO RELATED APPLICATIONS

This application claims the benefit of Japanese Patent Application No. 2017-088147, filed Apr. 27, 2017, which is hereby incorporated by reference in its entirety.

BACKGROUND

Technical Field

The present disclosure relates to an external unit and a motor and particularly relates to an external unit and a motor having a terminal for feeding power to the motor.

Background

A circuit element is provided in a power supply line of a motor in some cases. For example, in order to prevent overheating of a coil in the motor, a PTC (Positive Temperature Coefficient) thermistor is provided in the power supply line of the motor in some cases.

For example, Japanese Patent Laid-Open No. 2009-165209 describes a structure of a DC motor in which a PTC thermistor is provided.

SUMMARY

In the motor described in Japanese Patent Laid-Open No. 2009-165209, a structure in which a hole is opened in a bottom plate of the motor, and a PTC thermistor is arranged so as to pass through the hole is employed. However, in such a structure, since the hole through which the PTC thermistor passes is provided in the bottom plate of the motor, a measure against EMC (electromagnetic compatibility) noise becomes insufficient. For example, a switching noise of a commutator/brush is likely to emanate from the motor as a radiation noise through the hole in the bottom plate.

The present disclosure is related to providing an external unit and a motor capable of improving EMC performances of the motor and of arranging a circuit element in a power supply line of the motor.

In accordance with one aspect of the present disclosure, an external unit used by being mounted on a bottom part of a motor body having at least two motor terminals includes a holder, a PTC thermistor arranged on the holder, a first terminal connected to the PTC thermistor, a part of the first terminal being exposed to the outside of the holder, and a second terminal electrically connected to the first terminal through the PTC thermistor and electrically connected to one of the motor terminals, and the PTC thermistor is flat-plate shaped, and a surface of the PTC thermistor is directed toward a rotary shaft direction of the motor.

Preferably, the second terminal is fixed to the holder, and the second terminal has a pressing means in contact with the surface of the PTC thermistor, and the pressing means presses the PTC thermistor onto the holder.

Preferably, the PTC thermistor has electrode plates on both surfaces, the pressing means is in contact with one of the electrode plates, and the PTC thermistor is pressed onto the holder by the pressing means, thereby the first terminal is in contact with another of the electrode plates.

Preferably, the holder has an opening facing the surface of the PTC thermistor, and an outside of the holder and the inside of the holder are connected through the opening.

Preferably, the PTC thermistor has an outer peripheral edge shape recessed to avoid the rotary shaft of the motor or a hole part through which the rotary shaft of the motor passes.

Preferably, on a part of the external unit facing the bottom part of the motor body, an engaging means engaged with a part of the bottom part is provided.

Preferably, the second terminal has an engaging means, the engaging means is engaged with an engaged part provided on the motor terminal electrically connected to the second terminal, and the engaging means is engaged with the engaged part, thereby the second terminal is electrically connected to the motor terminal.

Preferably, the second terminal is formed so as to have flexibility.

Preferably, the holder has a wall facing a side surface of the PTC thermistor, and the first terminal or the second terminal faces the side surface of the PTC thermistor across the wall.

In accordance with another aspect of the present disclosure, an external unit used by being mounted on a bottom part of a motor body having at least two motor terminals includes a holder, a circuit element arranged on the holder, a first terminal connected to the circuit element, a part of the first terminal being exposed to an outside of the holder, and a second terminal electrically connected to the first terminal through the circuit element and electrically connected to one of the motor terminals, and the circuit element is flat-plate shaped, and the surface of the circuit element is directed toward a rotary shaft direction of the motor.

In accordance with still another aspect of the present disclosure, a motor includes a motor body and the external unit described in any one of the aforementioned configurations, mounted on the bottom part of the motor body, and the motor body has at least two motor terminals, and one of the motor terminals is in contact with the second terminal.

In accordance with these disclosures, the external unit and the motor capable of improving the EMC performances of the motor and of arranging the circuit element in the power supply line of the motor can be provided.

DETAILED DESCRIPTION

Hereinafter, a motor using an external unit in one of the present embodiments of the present disclosure will be described.

In the following description, a direction in parallel with a rotary shaft of the motor is referred to as a rotary shaft direction in some cases. Moreover, the rotary shaft direction is referred to as an up-and-down direction in some cases (a direction where the rotary shaft protrudes when seen from a frame of the motor is an upper direction). The terms "up-and-down", "upper", "lower" and the like referred to here are indicating methods employed for convenience when only the motor is focused on and do not limit a direction in a device on which this motor is mounted or a posture this motor is used in any way.

EMBODIMENTS

Figure 1:
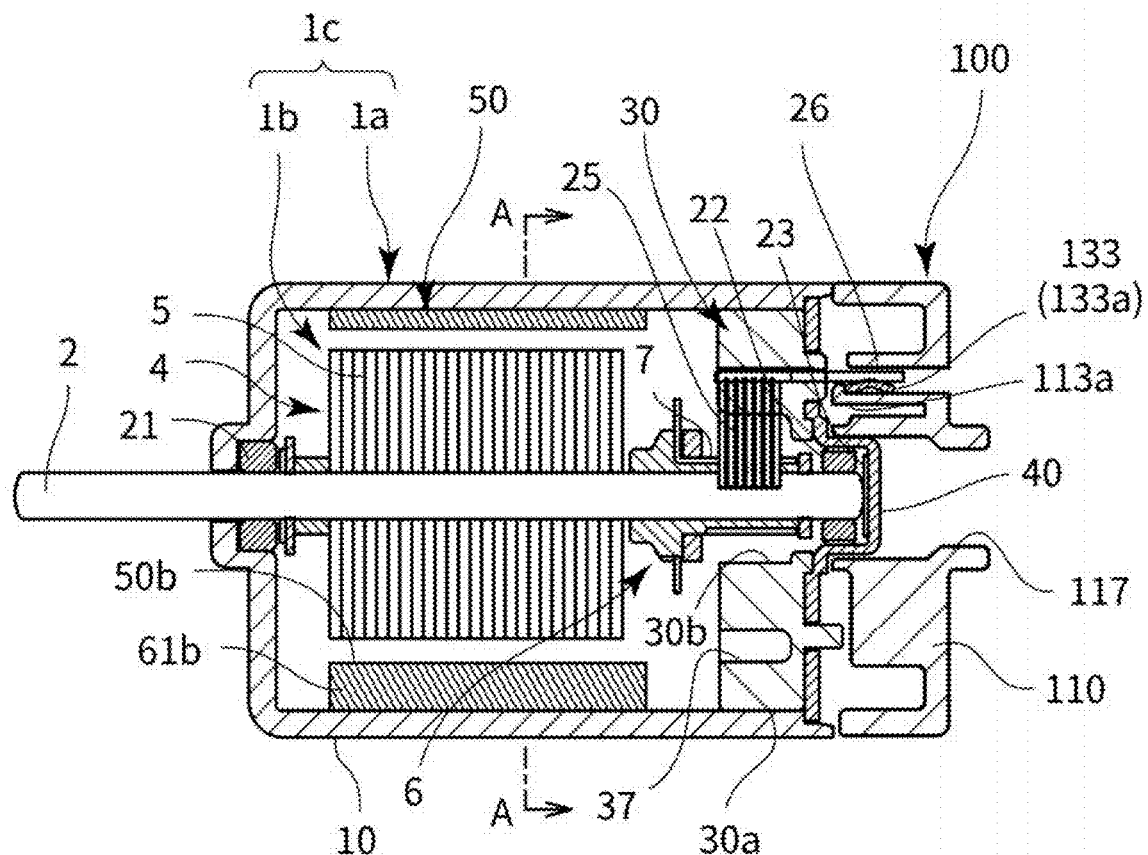
FIG. 1 is a sectional view illustrating a motor using an external unit in one of the embodiments of the present disclosure.

FIG. 1 is a sectional view illustrating the motor using the external unit in one of the present embodiments of the present disclosure.

A section illustrated in FIG. 1 is a section illustrated as a B-B line in FIG. 2 which will be described later. In the following figures, an arrow A1 indicates the rotary shaft direction. In the arrow A1, a direction having an arrowhead is an upper side.

The motor 1 is a DC motor, for example. The motor 1 roughly includes a motor body 1c and an external unit 100. The motor body 1c has a frame assembly 1a and an armature assembly 1b rotatable with respect to the frame assembly 1a. The external unit 100 is used by being mounted on a bottom part (a portion on a lower side) of the motor body 1c, for example.

The armature assembly 1b has a rotary shaft (shaft) 2, an armature portion 4, a commutator portion 6 and the like. The armature portion 4 is mounted on the rotary shaft 2. The armature portion 4 has an armature core 5 having salient poles protruding in plural in a radial direction, a wiring (not shown) wound around each salient pole and the like. The commutator portion 6 is provided in the vicinity of one of the end portions of the rotary shaft 2. The commutator portion 6 has a brush 25 provided on the frame assembly 1a, a commutator 7 in contact with the brush 25 and the like as will be described later.

The frame assembly 1a comprises a frame (motor case) 10, a bracket 30, a plate 40, a magnet 50 and the like.

The frame 10 includes an end portion on an upper side and an end portion on a lower side and has a cylindrical shape with the end portion on the upper side covered with a surface. That is, in the frame 10, a cup shape with the end portion on the lower side being an opening portion is provided. The opening portion of the end portion on the lower side (an end portion on a right side in FIG. 1) of the frame 10 is plugged by the plate 40. In a housing constituted by the frame 10 and the plate 40, the armature assembly 1b is accommodated.

The bracket 30 is mounted on the inner side of the plate 40. The bracket 30 holds a motor terminal 26 to which an electric current from an outside is supplied. The motor terminal 26 is connected to the brush 25. The brush 25 is held so as to be in contact with the commutator 7.

The rotary shaft 2 penetrates the surface on the upper side of the frame 10. That is, an upper end portion of the rotary shaft 2 protrudes from the frame 10 to the outside of the frame 10, and the other parts of the rotary shaft 2 are accommodated. At a center part of the surface on the upper side of the frame 10, a bearing 21 is held. Moreover, at a center part of the plate 40, a bearing 22 is held. Below the bearing 22, a thrust washer 23 is arranged. The rotary shaft 2 is supported by the bearings 21 and 22 at two locations and by the thrust washer 23 rotatably with respect to the frame 10.

Figure 2:
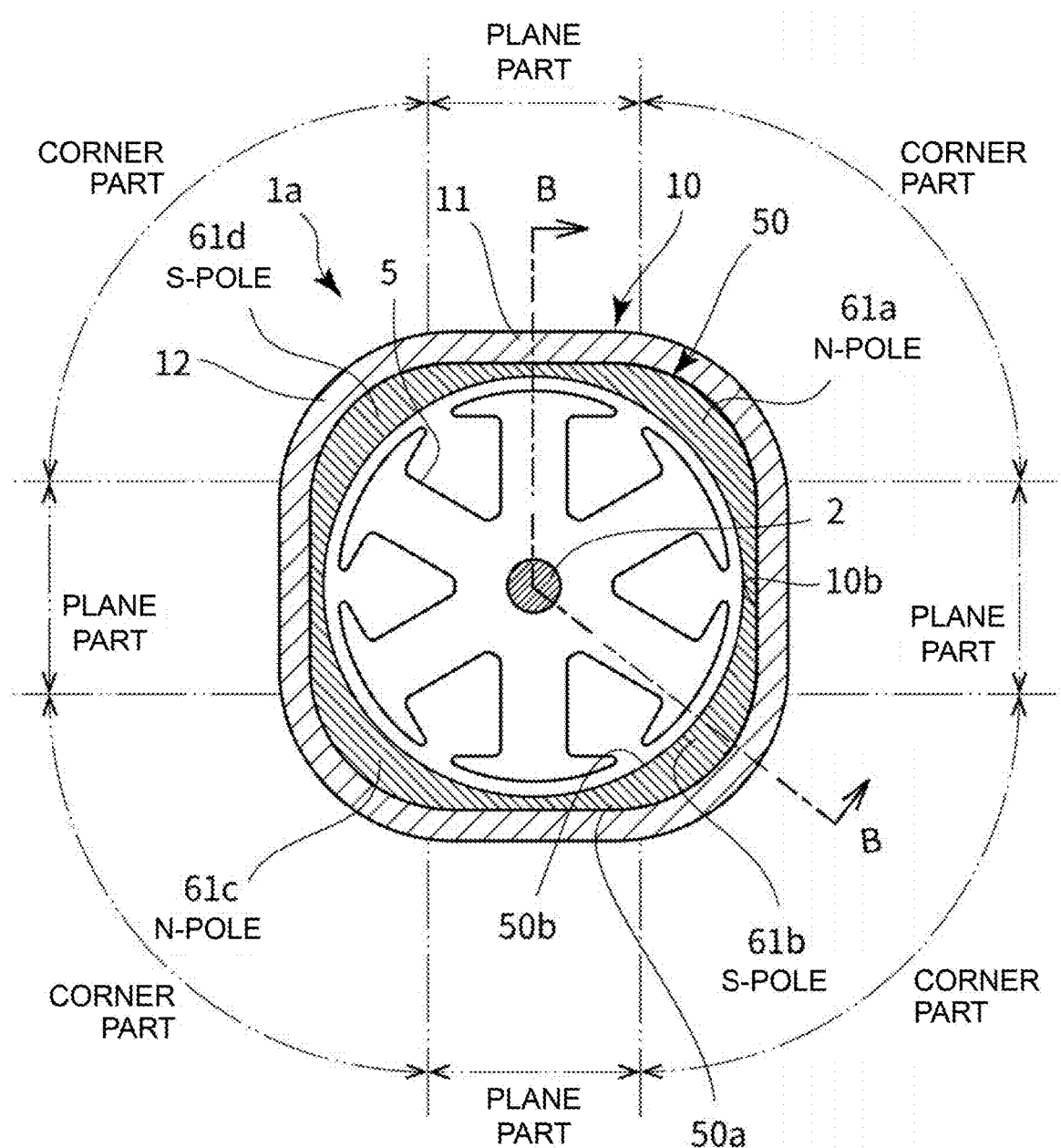
FIG. 2 is a sectional view on an A-A line in FIG. 1.

FIG. 2 is a sectional view on the A-A line in FIG. 1.

As illustrated in FIG. 2, in the present embodiment, one cylindrical magnet 50 is provided. The magnet 50 is arranged on the inner side of the frame 10. The frame assembly 1a has a sectional structure surrounding an outer peripheral surface 50a of the magnet 50 by the frame 10. The outer peripheral surface of the frame 10 becomes an outer peripheral surface of the motor body 1c. A plurality of magnets each having a magnetic pole element may be used.

The frame 10 is formed by using a magnetic material. The frame 10 has a plurality of corner parts 12 and plane parts 11 located between two adjacent corner parts 12. Specifically, the frame 10 has an outer shape having four plane parts 11 and corner parts 12, respectively. The two plane parts 11 adjacent in a circumferential direction are connected to each other through the one corner part 12. One of the two plane parts 11 adjacent in the circumferential direction is substantially perpendicular to another. The corner part 12 has a rounded shape (R-shape). The frame 10 is a substantially regular square on a section perpendicular to the rotary shaft 2. The frame 10 is formed having a square shape as the whole.

The frame 10 has a substantially uniform thickness. That is, an inner peripheral surface 10b of the frame 10 is constituted by a flat part of the plane part 11 and the rounded part of the corner part 12 connected in plural and is formed having a square shape.

The magnet 50 is a bonded magnet formed by using a known rare earth material and a known resin material, for example. The magnet 50 is not limited to the bonded magnet but may be a sintered type magnet, for example.

The magnet 50 has magnetic pole elements 61 (N-pole 61a, S-pole 61b, N-pole 61c, S-pole 61d). That is, the magnet 50 has the same number of magnetic pole elements 61 as the number of the corner parts 12 of the motor body 1c. The magnetic pole elements 61 are arranged in the circumferential direction so that the polarities alternate respectively. The four magnetic pole elements 61 are arranged at the four corner parts 12 of the frame 10 so that the magnetic pole elements 61 face each other. That is, switching parts of the four magnetic pole elements 61 are located at positions overlapping the plane parts 11 of the frame 10 in a radial direction, respectively.

The magnet 50 has an outer peripheral surface 50a rounded along an inner peripheral surface 10b of the frame 10 on the corner part 12. Moreover, the magnet 50 has an inner peripheral surface 50b having a columnar surface shape. A slight air gap is provided between the inner peripheral surface 50b of the magnet 50 and the armature core 5.

In the present embodiment, the magnet 50 is bonded to the inner peripheral surface 10b of the frame 10 by an adhesive (not shown). That is, the adhesive is located between the outer peripheral surface 50a of the magnet 50 and the inner peripheral surface 10b of the frame 10. The magnet 50 is accommodated inside the frame 10 through the opening portion on the lower side of the frame 10 and is bonded to the inner peripheral surface 10b of the frame 10. After that, the armature assembly 1b is accommodated inside the frame 10, and by mounting the bracket 30 and the plate 40 on the frame 10, the motor body 1c is assembled.

Figure 3:
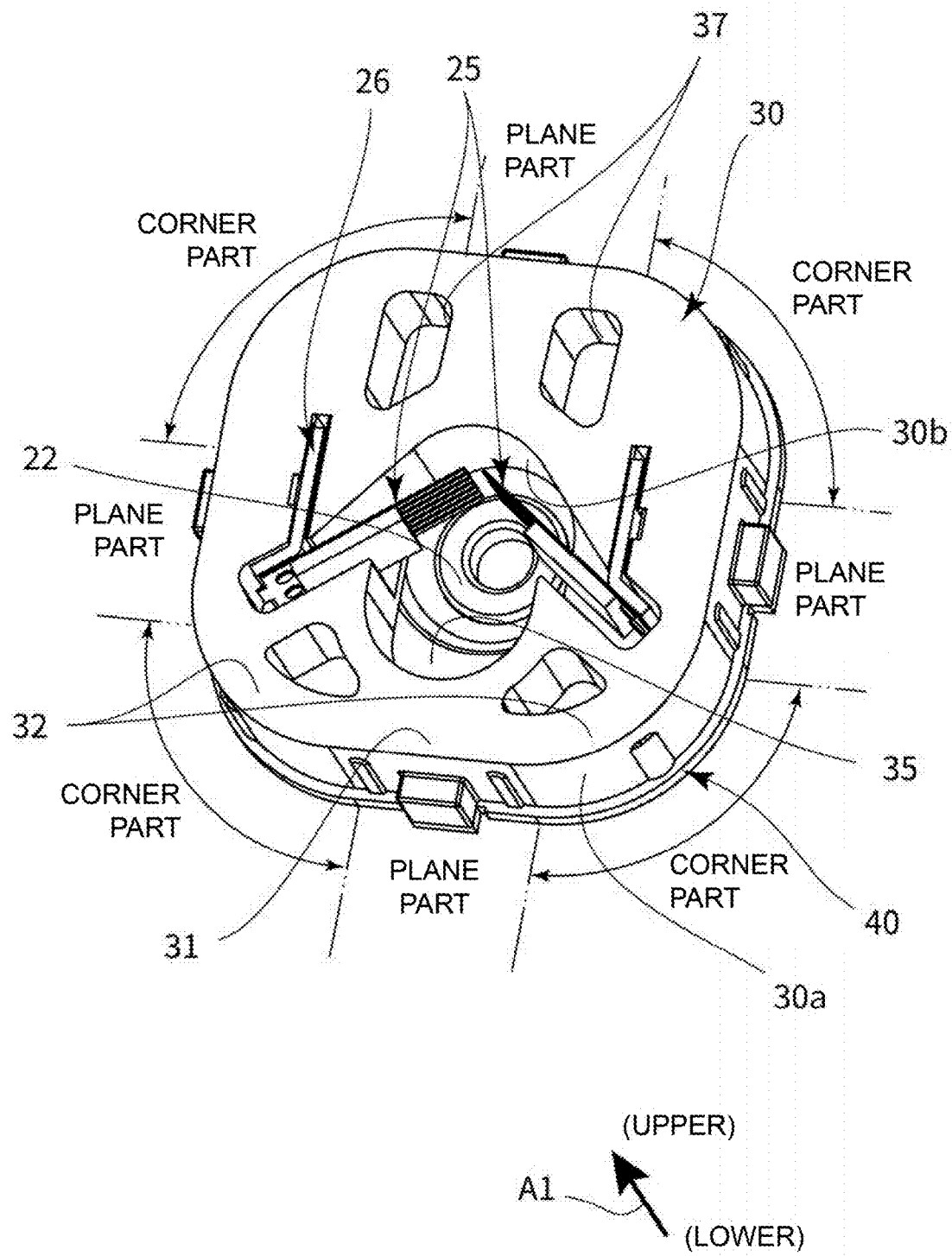
FIG. 3 is a perspective view illustrating a bracket and a plate.

FIG. 3 is a perspective view illustrating the bracket 30 and the plate 40.

In FIG. 3, parts on the upper sides of the bracket 30 and the plate 40 are illustrated. As illustrated in FIG. 3, the two motor terminals 26 are mounted on the bracket 30. One end portion of each of the brushes 25 is connected to the motor terminals 26. As a result, the two brushes 25 are supported by the motor terminals 26, respectively. Another end portion of each of the brushes 25 is in contact with the commutator 7 of the armature assembly 1b.

The bracket 30 is molded by a resin member, for example. The bracket 30 has a thickness in the rotary shaft direction. The bracket 30 has a cylinder part having an opening 35 through which the rotary shaft 2 passes. In the present embodiment, the bracket 30 is the cylinder part having the opening 35 at a center part. In the opening 35, the brush 25 is arranged. Moreover, the rotary shaft 2 penetrates through the opening 35. The bracket 30 has an outer peripheral surface 30a, an annular closed shape. That is, the cylinder part has the outer peripheral surface 30a.

When seen from the rotary shaft direction (on a plan view), the outer peripheral surface 30a of the cylinder part roughly has substantially the same shape as the inner peripheral surface 10b of the frame 10. That is, the bracket 30 has four corner parts 32 and plane parts 31 provided between the two adjacent corner parts 32. The outer peripheral surface 30a of the cylinder part is provided on the four corner parts 32 and the four plane parts. As illustrated in FIG. 1, in the rotary shaft direction, the outer peripheral surface 30a of the bracket 30 extends toward the magnet 50. A length of the bracket 30 in the rotary shaft direction is slightly larger than a dimension of the brush 25 in the rotary shaft direction, for example. The brush 25 is accommodated inside the opening 35.

On the bracket 30, a recess portion 37 formed so as to be recessed downward from an upper side is provided. Between the outer peripheral surface 30a of the cylinder part and the inner peripheral surface 30b forming the opening 35, a resin member is present excluding the recess portion 37 and other hole parts. Since the recess portion 37 is provided, molding of the bracket 30 can be carried out easily. The bracket 30 has rigidity in the radial direction. That is, in the bracket 30, a thickness in the radial direction from the outer peripheral surface 30a to the inner side is ensured to a certain degree, and even if a force in the radial direction is applied to a part of the outer peripheral surface 30a, the bracket 30 is hardly distorted. The recess portion 37 is provided by considering the rigidity of the bracket 30 so that the rigidity of the bracket 30 in the radial direction is not largely damaged.

In a state where the bracket 30 is mounted on the frame 10, the outer peripheral surface 30a of the bracket 30 is in contact with the inner peripheral surface 10b of the frame 10. The plane part 31 portions of the outer peripheral surface 30a in the bracket 30 facing the plane parts 11 of the frame 10 have rigidity in the radial direction.

Figure 4:
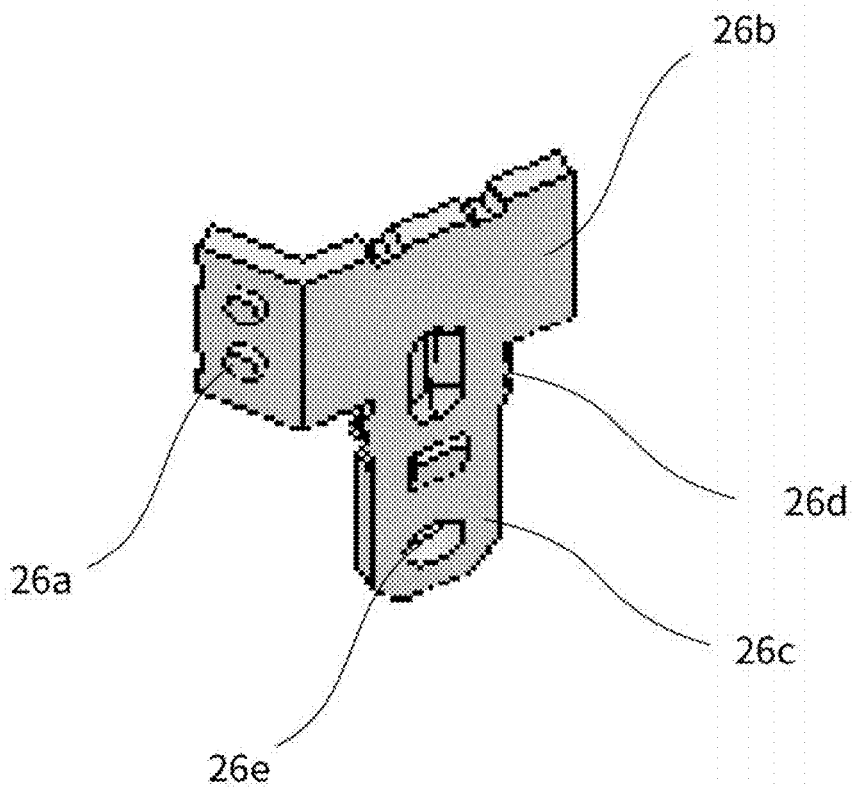
FIG. 4 is a perspective view illustrating a motor terminal.

FIG. 4 is a perspective view illustrating the motor terminal 26.

As illustrated in FIG. 4, the motor terminal 26 has a brush fixing portion 26a to which the brush 25 is fixed, a holding portion 26b held by the bracket 30, and a terminal piece 26c extending downward from the holding portion 26b. The motor terminal 26 is made of a metal plate. In a side edge of the terminal piece 26c, a retaining projection 26d having a serrated shape protruding to a side is provided on a portion in the vicinity of the holding portion 26b.

On the terminal piece 26c, a hole part (an example of an engaged part) 26e is formed. The engaged part may be one having a shape with a projection and a recess instead of the hole part 26e.

Figure 5:
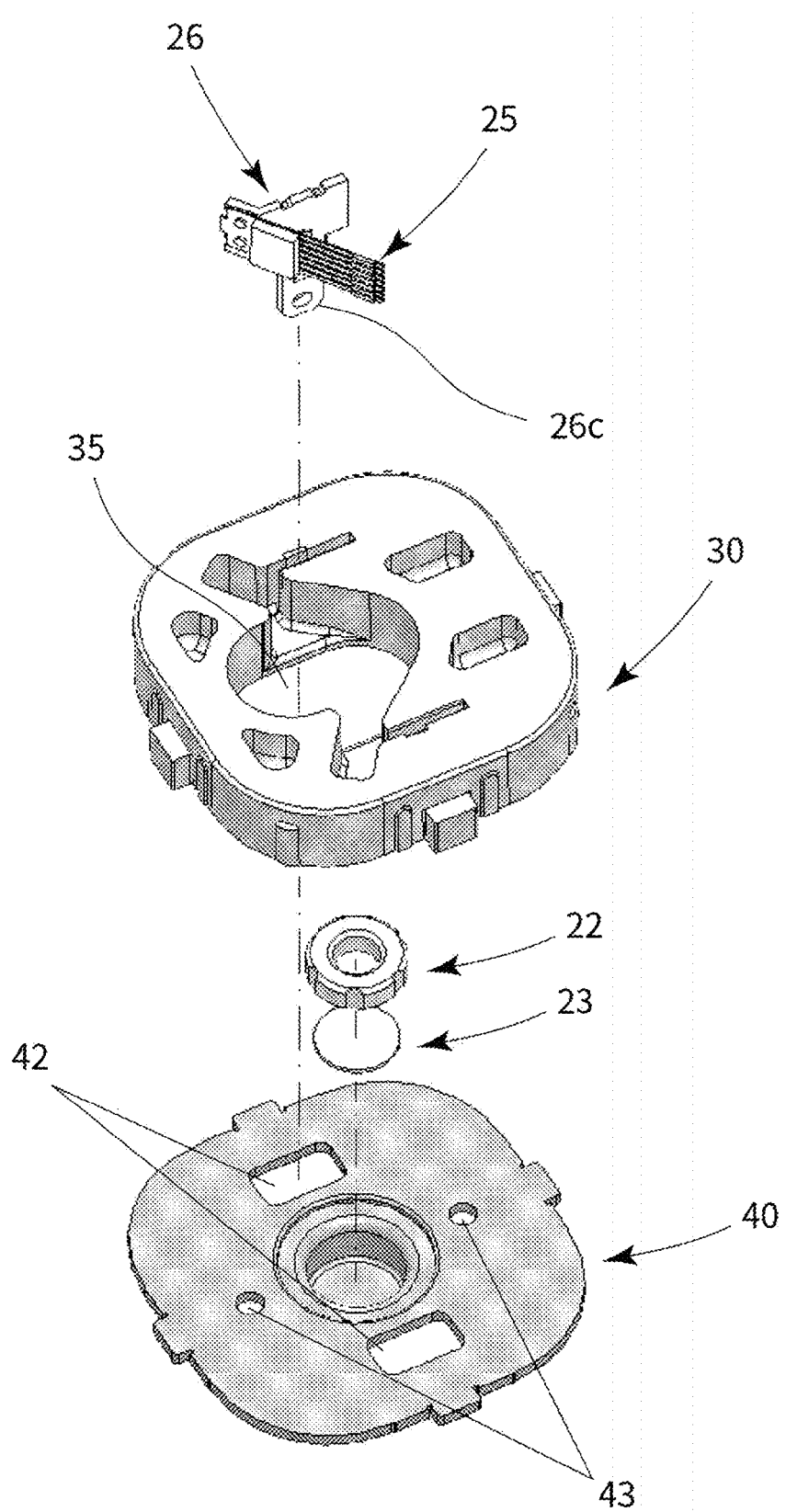
FIG. 5 is an exploded perspective view illustrating a structure including the bracket and the plate.

FIG. 5 is an exploded perspective view illustrating a structure including the bracket 30 and the plate 40.

In FIG. 5, an assembly of the brush 25 and the motor terminal 26 is illustrated only as one set. As illustrated in FIG. 5, by inserting the motor terminal 26 on which the brush 25 is mounted from above the bracket 30 to below, the holding portion 26b is held by the bracket 30. At this time, since the retaining projection 26d is hooked by a part of the bracket 30, the motor terminal 26 is prevented from being removed from the bracket 30.

The terminal piece 26c protrudes downward from the bracket 30. The terminal piece 26c penetrates through a terminal hole portion 42 formed in the plate 40 and protrudes below the plate 40. That is, the terminal piece 26c protrudes downward from the bottom part of the motor body 1c.

In the present embodiment, a small hole 43 for mounting the bracket 30 at a predetermined position is provided in the plate 40 other than the terminal hole portion 42. In the small hole 43, a projection portion (not shown) formed on the surface on the lower side of the bracket 30 is fitted. In the plate 40, a hole part is not formed other than the terminal hole portion 42 and the small hole 43.

Figure 6:
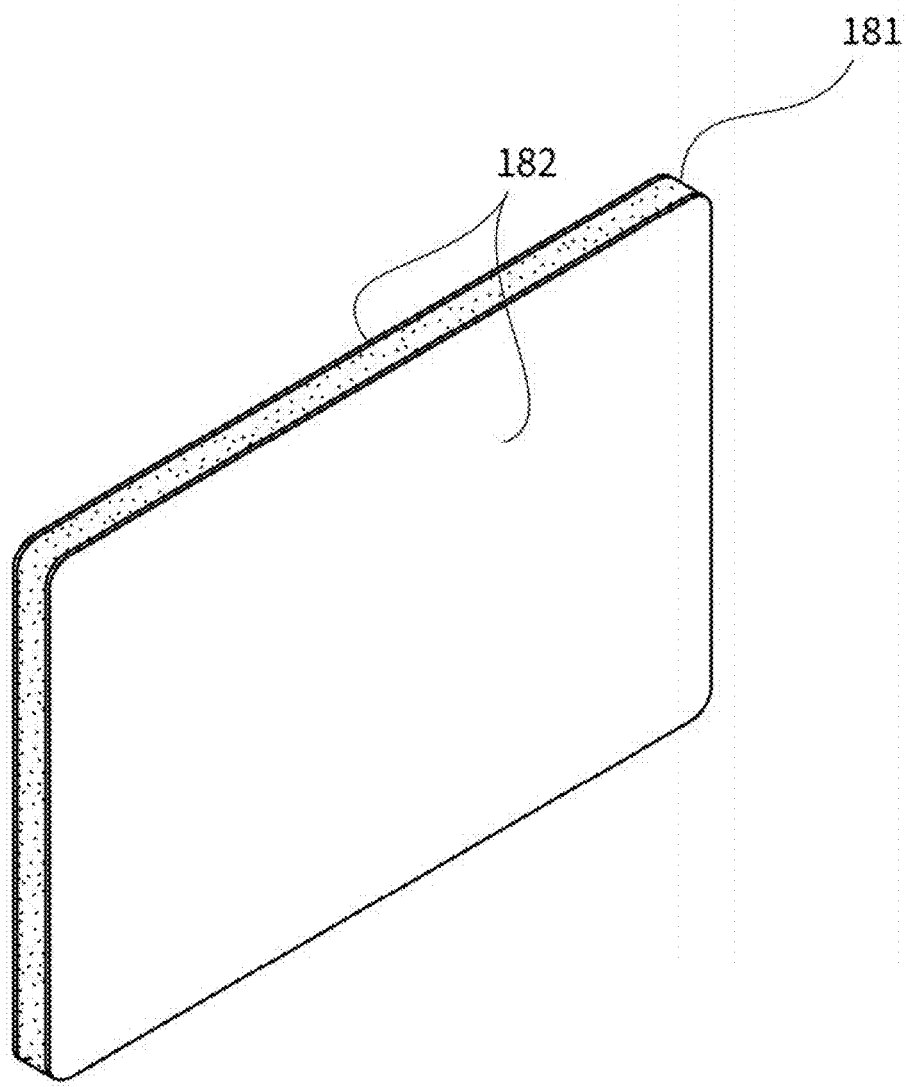
FIG. 6 is a perspective view illustrating a PTC thermistor.

FIG. 6 is a perspective view illustrating a PTC thermistor 180.

As illustrated in FIG. 6, the PTC thermistor 180 is flat-plate shaped. The PTC thermistor 180 is a single plate type, for example. That is, the PTC thermistor 180 has two surfaces with areas larger than the other surfaces. In other words, the PTC thermistor 180 has a cuboid shape having an upper surface and a lower surface with areas larger than the other side surfaces. The PTC thermistor 180 is constituted by sandwiching both surfaces (the upper surface and the lower surface) of a core 181 having a single plate shape by electrode plates 182, respectively. The electrode plates 182 form two surfaces of the PTC thermistor 180.

The PTC thermistor 180 may be a laminated plate shape in which plural layers of cores are laminated, for example.

Figure 7:
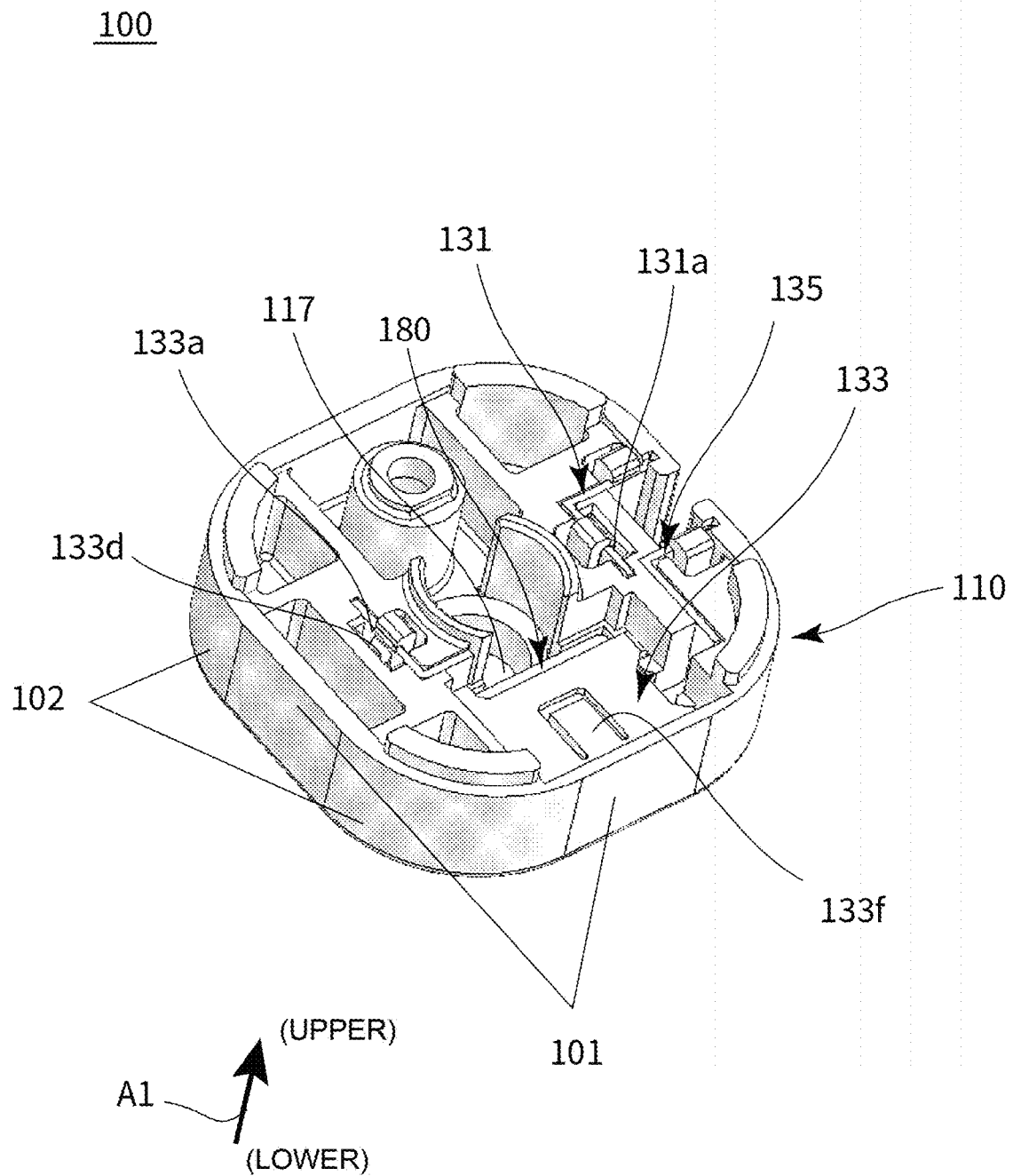
FIG. 7 is a perspective view illustrating the external unit.
Figure 8:
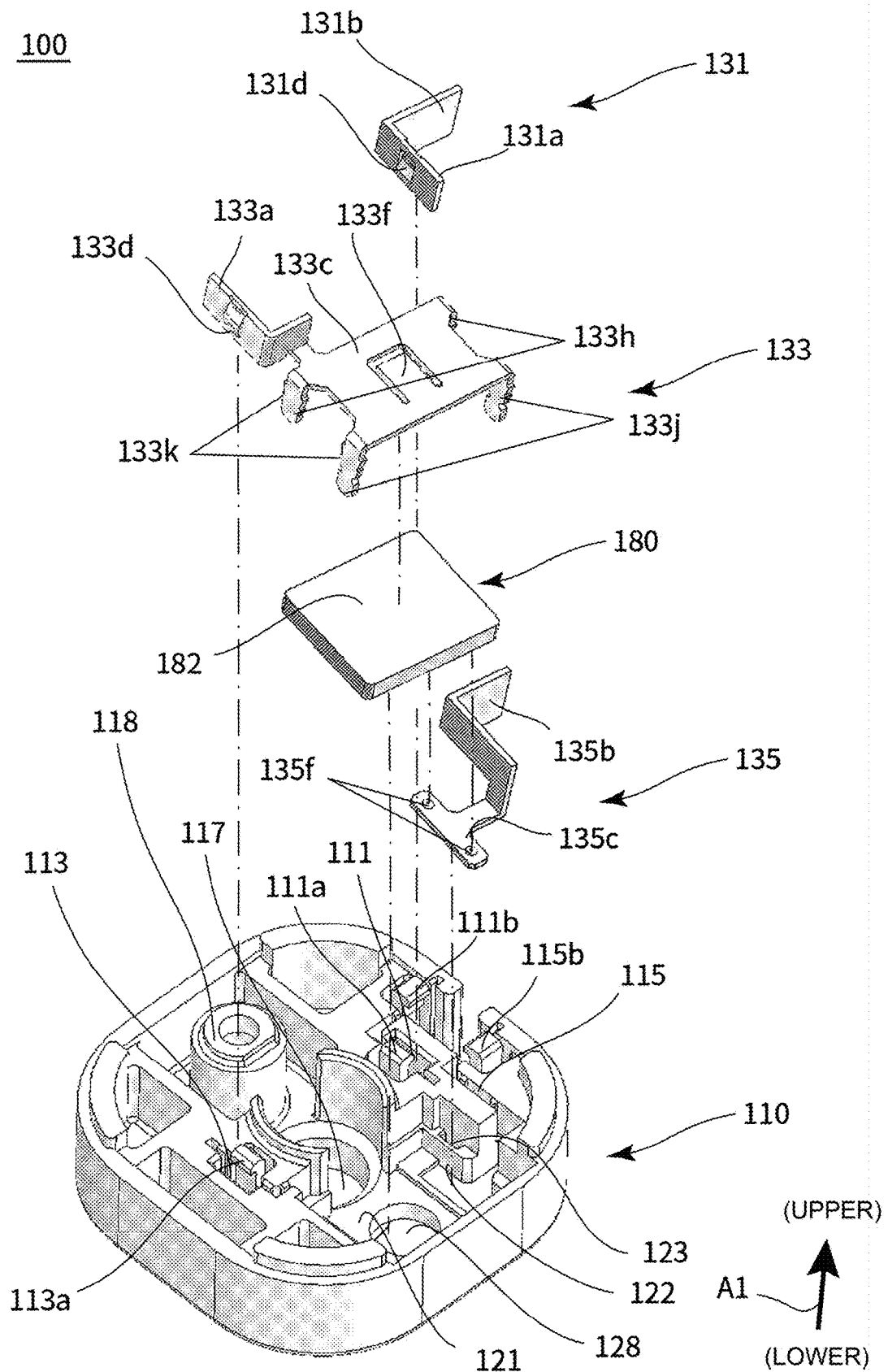
FIG. 8 is a first exploded perspective view illustrating the external unit.
Figure 9:
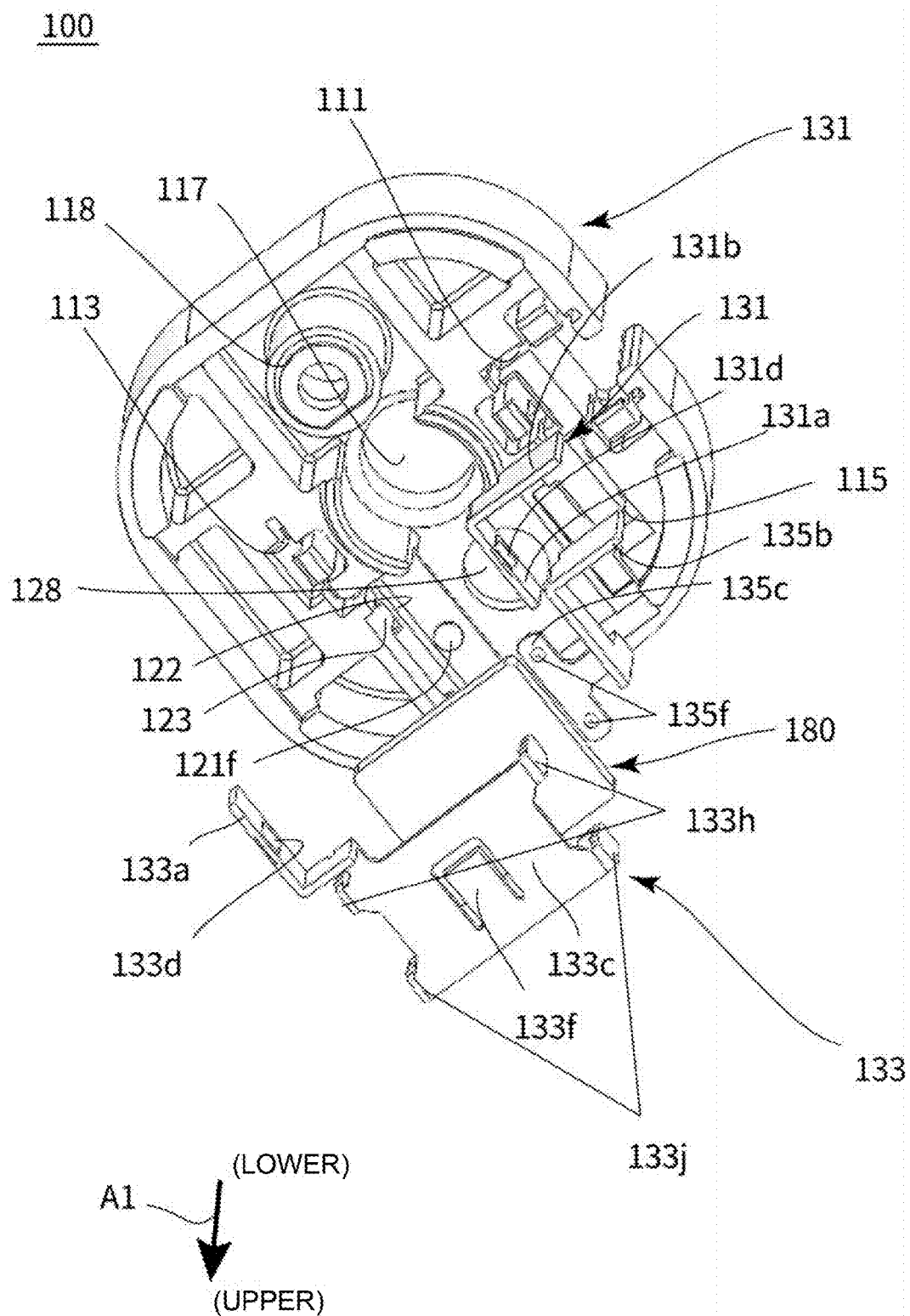
FIG. 9 is a second exploded perspective view illustrating the external unit.
Figure 10:
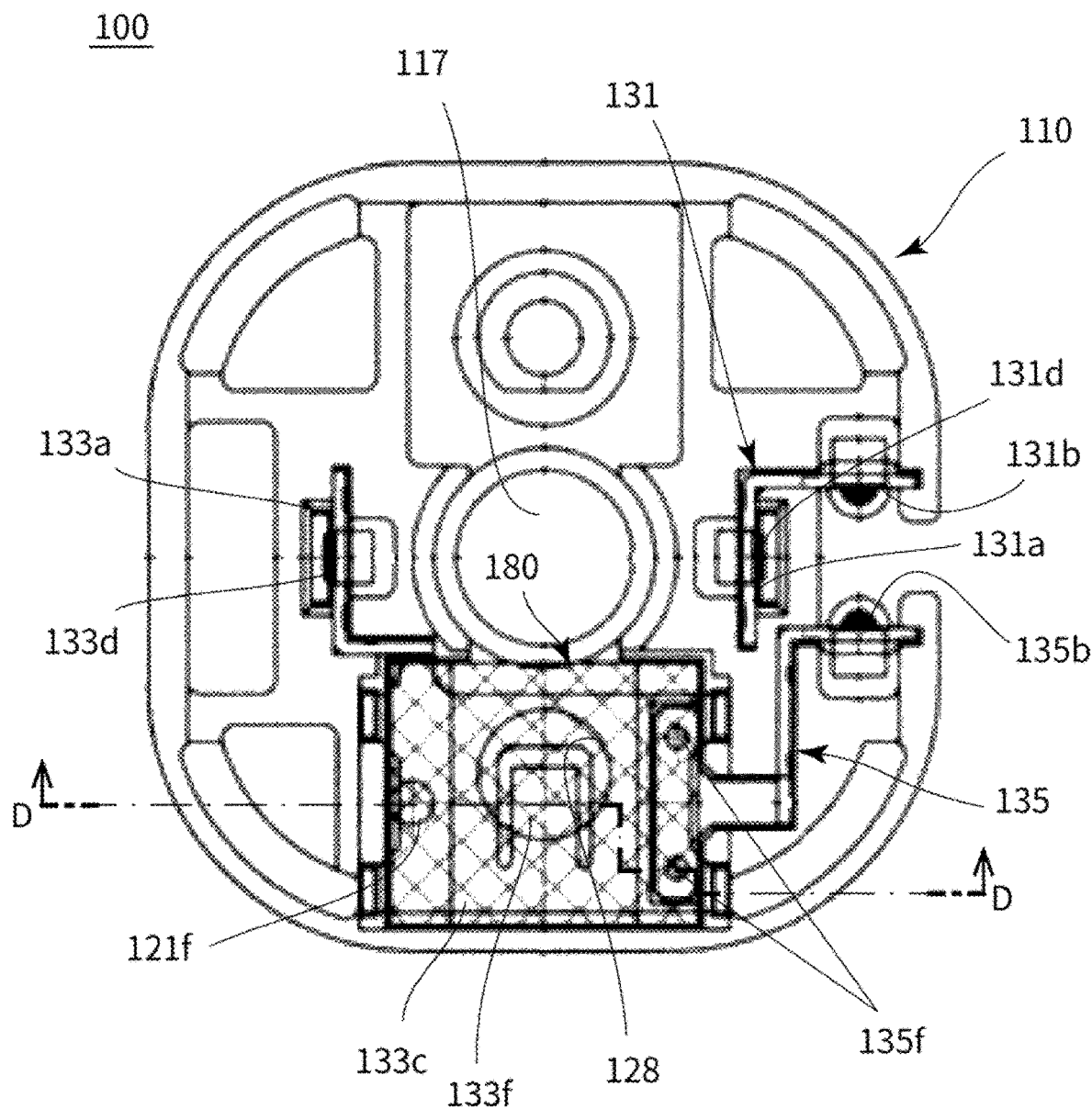
FIG. 10 is a top view illustrating the external unit.

FIG. 7 is a perspective view illustrating the external unit 100. FIG. 8 is a first exploded perspective view illustrating the external unit 100. FIG. 9 is a second exploded perspective view illustrating the external unit 100. FIG. 10 is a top view illustrating the external unit 100.

In FIGS. 7, 8, and 9, views of the external unit 100 seen from above are illustrated.

As illustrated in FIG. 7, the external unit 100 has a holder 110, an upper-side terminal (one example of a second terminal) 133, a lower-side terminal (one example of a first terminal) 135, a third terminal 131, and the PTC thermistor 180.

The holder 110 is made of a resin, for example. On the holder 110, the upper-side terminal 133, the lower-side terminal 135, the third terminal 131, and the PTC thermistor 180 are mounted.

An outer peripheral surface of the holder 110 has four corner parts 102 and plane parts 101 provided between two adjacent corner parts 102 similarly to the frame 10 of the motor body 1c, for example.

As illustrated in FIG. 8, on the holder 110, an upper-side terminal insertion portion 113, a lower-side terminal insertion portion 115, and a third terminal insertion portion 111 are formed. Each of the insertion portions 113, 115, and 111 has a groove shape capable of inserting the corresponding terminals 133, 135, and 131 from the upper side of the holder 110 (that is, the inner side of the holder 110). On the insertion portions 113, 115, and 111, claw portions 113a, 115b, 111a, and 111b each having a hook shape hooked by upper ends of the inserted terminals 133, 135, and 131 are formed, respectively. The claw portions 113a, 115b, 111a, and 111b are hooked by the upper ends of the terminals 133, 135, and 131, respectively, thereby the terminals 133, 135, and 131 are not removed from the holder 110.

At a center part of the holder 110, a hole 117 is formed. The hole 117 is formed on an extension of the rotary shaft 2 of the motor body 1c. That is, the hole 117 is formed so that the center part of the plate 40 of the motor body 1c can be seen from below the motor 1. As a result, even if a process of applying a downward force to the rotary shaft of the motor body 1c is included in an assembling process of a device using the motor 1, for example, the center part of the plate 40 can be supported through the hole 117 easily.

Between the hole 117 and the one plane part 101, a recess portion 118 extending upward from the lower surface of the holder 110 is provided. The recess portion 118 is formed so as to protrude upward when seen from an inner side of the holder 110. An upper end surface of the recess portion 118 is located at a position capable of being in contact with the bottom surface of the plate 40 when the holder 110 is mounted on the motor body 1c. A hole is formed in the upper end surface of the recess portion 118. In the plate 40, by providing a hole part at a position facing the recess portion 118 and by using a screw or a rivet-shaped member, the holder 110 and the plate 40 can be coupled through the recess portion 118. As a result, the holder 110 and the motor body 1c can be coupled.

The hole 117 or the recess portion 118 does not have to be provided. A coupling method between the holder 110 and the motor body 1c using the recess portion 118 does not have to be used. For example, as a method of mounting the holder 110 on the motor body 1c, only a method by engagement between the motor terminal 26 and the upper-side terminal 133 and the third terminal 131 as will be described later may be employed.

On the holder 110, an accommodating portion 121 in which the PTC thermistor 180 is accommodated is provided. The accommodating portion 121 is provided close to the one plane part 101, for example. The accommodating portion 121 is formed so that the PTC thermistor 180 having a substantially rectangular plate shape is arranged from above the holder 110 in a posture substantially perpendicular to the rotary shaft direction and with one side surface of the PTC thermistor 180 substantially in parallel with the one plane part 101 as will be described later.

In the vicinity of the accommodating portion 121, a wall 122 facing the side surface of the PTC thermistor 180 arranged in the accommodating portion 121 is formed. The wall 122 is formed of a resin member forming the holder 110. At a position farther away from the PTC thermistor 180 than the wall 122, hole parts 123 into which arm portions 133h and 133j of the upper-side terminal 133 are inserted as will be described later are formed.

As illustrated in FIG. 9, a contact projection 121f protruding upward is formed on a bottom surface of the accommodating portion 121. The contact projection 121f is formed so as to face the lower surface of the PTC thermistor 180 arranged in the accommodating portion 121. The contact projection 121f is formed so as to be in contact with one spot on a portion closer to a side peripheral surface in the lower surface of the PTC thermistor 180 arranged in the accommodating portion 121.

On the bottom surface of the accommodating portion 121, an opening 128 vertically penetrating the holder 110 is provided. The opening 128 is formed so as to face the surface of the PTC thermistor 180 arranged in the accommodating portion 121. The outside of the holder 110 and the inside of the holder 110 are connected through the opening 128. Since the opening 128 is formed as described above, the temperature of outside air can be transferred easily to the PTC thermistor 180. Thus, the temperature of the PTC thermistor 180 can rise easily with respect to a temperature rise outside of the motor 1, and when the temperature rises outside the motor 1, an electric current can be controlled early by the PTC thermistor 180.

As illustrated in FIG. 8, the PTC thermistor 180 is arranged in the accommodating portion 121. In the present embodiment, the surfaces of the PTC thermistor 180 are directed toward the rotary shaft direction of the motor. That is, one of the two electrode plates 182 of the PTC thermistor 180 is directed upward and another is directed downward. In other words, the surfaces of the PTC thermistor 180 are perpendicular to the rotary shaft direction or have angles close to perpendicular to the rotary shaft direction. The PTC thermistor 180 is arranged in a posture not in parallel with the rotary shaft direction but inclined with respect to the rotary shaft direction.

The PTC thermistor 180 is arranged with one side surface substantially in parallel with the one plane part 101.

The third terminal 131 is a metal plate molded by a press or the like. The third terminal 131 has a band shape bent substantially at a right angle into an "L" shape. One end of the third terminal 131 is a motor-side terminal piece 131a connected to the motor terminal 26. Another end of the third terminal 131 is an external terminal surface 131b exposed to the outside of the holder 110.

On the motor-side terminal piece 131a, a projection portion (one example of engaging means) 131d is provided. The projection portion 131d is formed so that a part of the motor-side terminal piece 131a is pushed out in a direction perpendicular to the motor-side terminal piece 131a and is raised from the motor-side terminal piece 131a. The projection portion 131d is formed so as to protrude toward the motor terminal 26 connected to the motor-side terminal piece 131a as will be described later. The projection portion 131d protrudes in the direction substantially perpendicular to the rotary shaft direction.

The lower-side terminal 135 is a metal plate molded by a press or the like. The lower-side terminal 135 has a shape in which a band-shaped metal plate is bent substantially at a right angle at two locations. One end of the lower-side terminal 135 is the external terminal surface 135b exposed to the outside of the holder 110. Another end of the lower-side terminal 135 is an element-side terminal surface 135c extending toward the surface on the lower side of the PTC thermistor 180.

The element-side terminal surface 135c is located below the PTC thermistor 180. The element-side terminal surface 135c is located at a position away from the position where the contact projection 121f is formed. On the element-side terminal surface 135c, two contact projections 135f protruding upward, respectively, are formed. Each of the contact projections 135f is formed so as to face the lower surface of the PTC thermistor 180 arranged in the accommodating portion 121. Each of the contact projections 135f is formed so as to be in contact with one spot on a portion closer to the side peripheral surface in the lower surface of the PTC thermistor 180 arranged in the accommodating portion 121. That is, the element-side terminal surface 135c of the lower-side terminal 135 is in contact with the electrode plate 182 on the lower side of the PTC thermistor 180. Each of the contact projections 135f is arranged at a position away from the contact projection 121f of the holder 110.

As illustrated in FIG. 10, the PTC thermistor 180 arranged in the accommodating portion 121 is in contact with three locations, that is, the one contact projection 121f and the two contact projections 135f. A triangle connecting the three points with which the PTC thermistor 180 is in contact and the center part of the PTC thermistor 180 overlap when seen from the rotary shaft direction.

In the present embodiment, the external terminal surface 131b of the third terminal 131 and the external terminal surface 135b of the lower-side terminal 135 face each other in the vicinity of the plane part 101 different from the plane part 101 in the vicinity of the PTC thermistor 180. The external terminal surfaces 131b and 135b are exposed to the outside of the holder 110 and are capable of applying a voltage to the external terminal surfaces 131b and 135b and of feeding power to the motor 1 from external circuits and the like.

In the present embodiment, a lead wire is connected to each of the external terminal surfaces 131b and 135b (not shown). The lead wire is connected to the external terminal surfaces 131b and 135b by a method such as soldering or resistor welding, for example. By connecting the lead wire to a supply line of an external power supply, the motor 1 can be wired so that it is capable of being driven. The lower-side terminal 135 and the third terminal 131 may have a female-type terminal or a male-type terminal capable of connection with the external circuit instead of the external terminal surfaces 131b and 135b. The female-type terminal only needs to be constituted to be exposed to the outside of the holder 110 so as to be brought into contact with the male-type terminal inserted into the external unit 100 from the outside, for example. The male-type terminal only needs to be constituted to protrude from the holder 110 and be capable of connecting the female-type terminal provided in the external circuit, a lead wire and the like, for example.

The upper-side terminal 133 is a metal plate molded by a press or the like. The upper-side terminal 133 has a plate-shaped plate portion 133c covering an upper surface of the PTC thermistor 180 and a band-shaped motor-side terminal piece 133a bent from the plate portion 133c and extending therefrom. The motor-side terminal piece 133a is connected to the motor terminal 26. The upper-side terminal 133 is fixed to the holder 110.

On the motor-side terminal piece 133a, a projection portion (one example of the engaging means) 133d is provided. The projection portion 133d is formed so that a part of the motor-side terminal piece 133a is pushed out in the direction perpendicular to the motor-side terminal piece 133a and is raised from the motor-side terminal piece 133a. The projection portion 133d is formed so as to protrude toward the motor terminal 26 connected to the motor-side terminal piece 133a as will be described later. The projection portion 133d protrudes in the direction substantially perpendicular to the rotary shaft direction.

At a center part of the plate portion 133c, a pressing terminal (one example of pressing means) 133f is formed. The pressing terminal 133f has a rectangular shape with one side connected to the plate portion 133c. That is, a gap is provided between three sides of a peripheral edge part of the pressing terminal 133f and the plate portion 133c. The pressing terminal 133f is a cantilever-shape supported by the plate portion 133c on the one side portion connected to the plate portion 133c. The pressing terminal 133f is a tongue-shape supported by the plate portion 133c on the one side portion connected to the plate portion 133c. The pressing terminal 133f can be deflected with respect to the plate portion 133c. That is, the upper-side terminal 133 has flexibility.

The pressing terminal 133f is bent slightly downward from the plate portion 133c. The pressing terminal 133f is in contact with the surface of the PTC thermistor 180. That is, the pressing terminal 133f is in contact with the electrode plate 182 on the upper side of the PTC thermistor 180. As a result, the upper-side terminal 133 is electrically connected to the lower-side terminal 135 through the PTC thermistor 180.

On the side edge part of the plate portion 133c, the two arm portions 133h and the two arm portions 133j bent from the plate portion 133c and extending downward are provided. The arm portion 133j is extended longer in a lower direction than the arm portion 133h. The four arm portions 133h and 133j are inserted into the four hole parts 123 adjacent to the accommodating portion 121 with the wall 122 between them. On a side edge of each of the arm portions 133h and 133j, a retaining projection 133k having a serrated shape protruding to the side is provided.

The upper-side terminal 133 is fixed to the holder 110 by inserting the four arm portions 133h and 133j into the four hole parts 123 from above to below. At this time, the retaining projection 133k is hooked by a part of the holder 110, and the upper-side terminal 133 is prevented from being removed from the holder 110.

Figure 11:
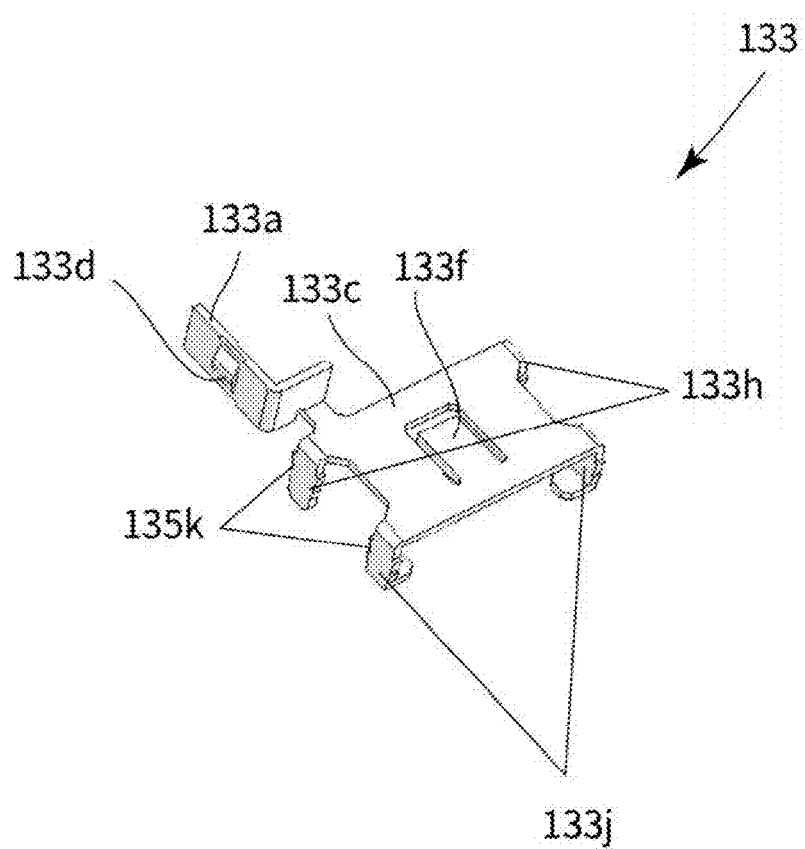
FIG. 11 is a perspective view illustrating an upper-side terminal in a state fixed to a holder.

FIG. 11 is a perspective view illustrating the upper-side terminal 133 in a state fixed to the holder 110.

In FIG. 11, only the upper-side terminal 133 is illustrated. After the upper-side terminal 133 is inserted into the holder 110, tip end portions of the two arm portions 133j are bent. That is, since the tip end portion of the arm portion 133j is bent, the arm portion 133j cannot be pulled out above from the hole part 123. As a result, the upper-side terminal 133 is reliably held by the holder 110.

Figure 12:
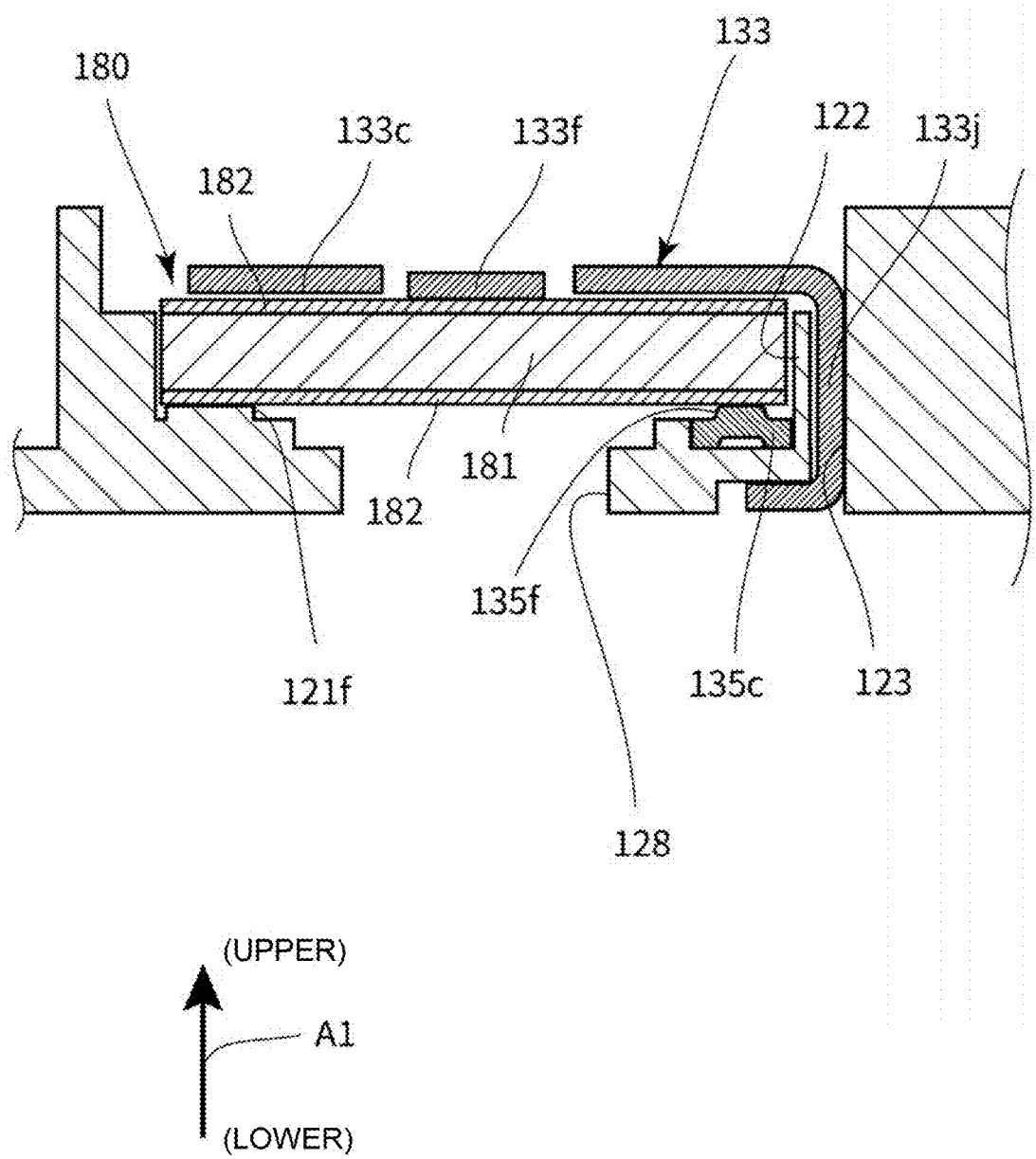
FIG. 12 is a sectional view on a D-D line in FIG. 10.

FIG. 12 is a sectional view on a D-D line in FIG. 10.

In a state where the upper-side terminal 133 is fixed to the holder 110 as described above, as illustrated in FIG. 12, the pressing terminal 133f is in contact with the surface of the PTC thermistor 180 and presses the PTC thermistor 180 onto the holder 110.

That is, in the state where the upper-side terminal 133 is fixed to the holder 110, the pressing terminal 133f is in contact with the center part of the electrode plate 182 on the upper side of the PTC thermistor 180. Moreover, the PTC thermistor 180 is supported from the lower side at three points in the vicinity of the side edge of the electrode plate 182 on the lower side by the one contact projection 121f and the two contact projections 135f. In this state, the pressing terminal 133f is pushed up by the PTC thermistor 180 to an upper side more than in a natural state (a state where no force is applied to the upper-side terminal 133) and is deflected. Thus, the PTC thermistor 180 is pressed toward the contact projections 121l and 135f by a restoring force of the pressing terminal 133f. In other words, the lower-side terminal 135 is in contact with the other of the electrode plates 182 since the PTC thermistor 180 is pressed by the pressing terminal 133f onto the holder 110. As described above, the state where the PTC thermistor 180 reliably contacts the upper-side terminal 133 and the lower-side terminal 135 is maintained.

Here, as illustrated in FIG. 12, the arm portions 133h and 133j of the upper-side terminal 133 inserted into the hole parts 123 and the side surface of the PTC thermistor 180 face each other across the wall 122. Since the wall 122 is provided, the arm portions 133h and 133j and the PTC thermistor 180 are not brought into contact and thus, a state where the PTC thermistor 180 reliably functions in a power feeding path of the motor 1 is maintained.

When terminals other than the upper-side terminal 133 such as the lower-side terminal 135 or the third terminal 131 are arranged so as to pass the vicinity of the PTC thermistor 180, too, the terminal and the PTC thermistor 180 are prevented from being brought into contact unintentionally by providing a wall such as the wall 122 between the PTC thermistor 180 and the terminal.

On a part of the external unit 100 facing the bottom part of the motor body 1c, an engaging portion engaged with a part of the bottom part is provided. The external unit 100 is fixed to the bottom part of the motor body 1c by the engaging portion engaged with the engaged portion provided on the bottom part side of the motor body 1c.

Specifically, on the terminal piece 26c of the motor terminal 26, for example, a hole part 26e (one example of the engaged portion; one example of a part of the bottom part) is provided. The terminal piece 26c protrudes downward from the plate 40 being the bottom part of the motor body 1c. The hole part 26e becomes the engaged portion. The two terminal pieces 26c protrude downward from the motor body 1c. On an upper surface side of the external unit 100, the motor-side terminal piece 133a of the upper-side terminal 133 and the motor-side terminal piece 131a of the third terminal 131 are exposed so as to correspond to each of the terminal pieces 26c, respectively. On each of the motor-side terminal pieces 131a and 133a, the projection portions 131d and 133d (one example of the engaging means) that become the engaging portions are formed.

In the external unit 100, on sides to which the projection portions 131d and 133d protrude into the motor-side terminal pieces 131a and 133a at the two locations, insertion spaces for the terminals are provided. By inserting the two terminal pieces 26c into the insertion spaces, the projection portions 131d and 133d are brought into contact with the surfaces of the terminal pieces 26c, and at least either one of the motor-side terminal pieces 131a, 133a and the terminal pieces 26c is slightly deflected. The projection portions 131d and 133d and the hole parts 26e of the terminal pieces 26c are overlapped in the direction perpendicular to the rotary shaft direction, thereby the projection portions 131d and 133d are fitted in the hole parts 26e (one example of engagement). Since the terminal pieces 26c on the motor body 1c side and the motor-side terminal pieces 131a and 133a on the external unit 100 side are engaged as described above, the external unit 100 is fixed to the motor body 1c. A recess-shaped engaged portion may be provided instead of the hole part 26e.

Forms of the engaging portion and the engaged portion with which it is engaged are not limited to the above. The motor body 1c side may have a female-type terminal (one example of the engaged portion), instead of the male-type terminal as in the present embodiment, and a male-type terminal piece (one example of the engaging means) protruding upward and engaged with the female-type terminal of the motor body 1c may be provided in the external unit 100. A projection-shaped engaged portion may be formed on a terminal piece on the motor body 1c side, and a hole-shaped or a recess-shaped engaging portion may be formed on the terminal piece on the external unit 100 side. Moreover, the engaged portion on the motor body 1c side is not limited to the terminal piece 26c but need only be provided at an appropriate portion such as a part of the plate 40 of the motor body 1c or a part of the frame 10, a part of the bracket 30 and the like. Similarly, the engaging portion on the external unit 100 side is not limited to the motor-side terminal pieces 131a and 133a but only needs to be provided at an appropriate portion such as a part of the holder 110 or a member mounted on the holder 110 and the like.

Conventionally, in such a small-sized motor, ensuring a space for providing a circuit element such as a PTC thermistor or the like has been difficult in some cases. If the plate-shaped PTC thermistor is to be arranged in the small-sized small-diameter motor, for example, the PTC thermistor is arranged substantially in parallel with the rotary shaft in general. However, if a length of the motor in the rotary shaft direction is limited, it has been difficult to arrange the PTC thermistor substantially in parallel with the rotary shaft as above.

On the other hand, in the present embodiment, the PTC thermistor 180 can be arranged in the posture substantially perpendicular to the rotary shaft direction. Thus, a dimension of the motor 1 in the rotary shaft direction can be made shorter.

The upper surface of the PTC thermistor 180 faces the plate 40 to become the bottom surface of a housing of the motor body 1c. That is, since the PTC thermistor 180 is arranged so that an area capable of sensing a heat of the motor body 1c is made larger, detection accuracy of the PTC thermistor 180 is improved.

Moreover, the PTC thermistor 180 is accommodated in the external unit 100 that can be externally attached to the motor body 1c that can function as a motor even as a single body. A hole through which the PTC thermistor penetrates does not have to be provided in the housing of the motor. Therefore, the motor 1 incorporating the PTC thermistor 180 can be manufactured without damaging EMC performance of the motor body 1c.

Moreover, after the motor body 1c and the external unit 100 are manufactured, respectively, by assembling the motor body 1c and the external unit 100, the motor 1 can be manufactured. Thus, a manufacturing line for manufacturing the motor body 1c not having the PTC thermistor 180 and a manufacturing line with the external unit 100 can be made separate. Efficient manufacture in the same manufacturing line can be realized regardless of a difference on whether the motor body 1c is used as a motor as a single body or is used as the motor 1 with the PTC thermistor 180.

The external unit 100 is fixed to the motor body 1c by being engaged with the bottom part of the motor body 1c. Therefore, by mounting the external unit 100 having the same constitution on the various types of motor bodies 1c with different wirings or lengths of the rotary shafts and the like having the bottom part constituted in the same form, the motors 1 with the PTC thermistors 180 with different specifications such as wirings, rotary shafts and the like can be manufactured, respectively. Therefore, separate manufacturing lines for each motor with fine specification differences do not have to be prepared, and the external unit 100 used for various types of motor bodies can be manufactured by the same manufacturing line and thus, the motor 1 can be manufactured efficiently.

The PTC thermistor 180 is incorporated in a power source supply line of the motor 1 without using soldering or the like. Therefore, the manufacture of the motor 1 can be carried out easily, and nonconformities caused by defective connection of a solder or the like can be prevented.

In the manufacture of the external unit 100, there is no process such that, while the upper-side terminal 133 or the lower-side terminal 135 is in contact with the electrode plate 182 of the PTC thermistor 180, both are relatively moved by sliding one of them with respect to another or the like. Therefore, since the electrode plate 182 is not scratched by the upper-side terminal 133 or the lower-side terminal 135, and the PTC thermistor 180 is not damaged in the manufacture of the external unit 100, the external unit 100 can be manufactured easily.

The center part on the upper surface of the PTC thermistor 180 is pressed downward by the pressing terminal 133f. Moreover, the lower surface of the PTC thermistor 180 is supported by the contact projection 121f in one side edge vicinity part and is supported by the contact projection 135f in a side edge vicinity part on an opposite side with the center part between them in the direction perpendicular to the rotary shaft direction. That is, the PTC thermistor 180 is held by the holder 110 in a state receiving a load on the center part of a both-end supported beam, and a state in contact with the contact projection 135f of the lower-side terminal 135 is reliably maintained.

As the PTC thermistor 180, a plate type can be used. Since the inexpensive PTC thermistor 180 can be used, as compared with a case where a PTC thermistor of a surface mount type is used, manufacturing cost of the motor 1 can be reduced. Moreover, since the plate-type PTC thermistor 180 can be used, the PTC thermistor 180 with an appropriate shape according to the shape of the external unit 100 or an application of the motor 1 can be used. Therefore, the components in the external unit 100 can be more freely arranged.

[Description of Variation of Present Embodiment]

The shape of the PTC thermistor is not limited to a rectangle of the type described above.

Figure 13:
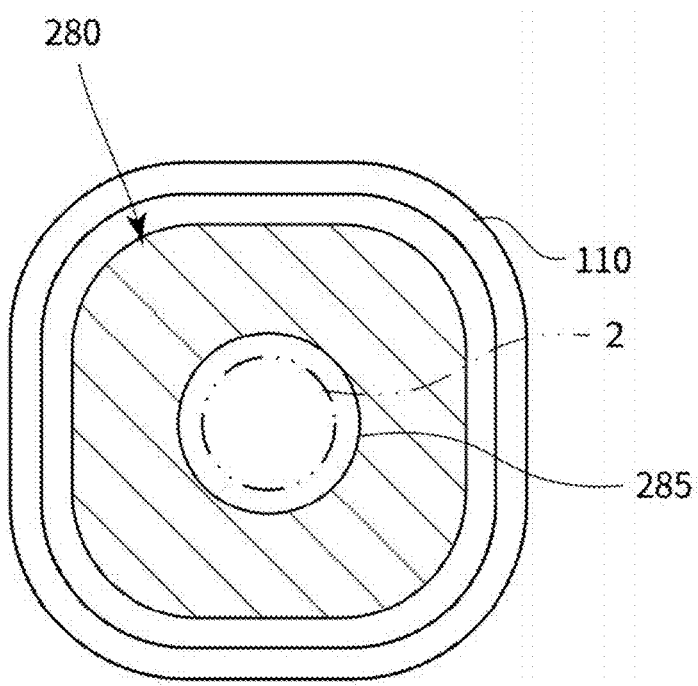
FIG. 13 is a view illustrating an example of the PTC thermistor having a shape different from the present embodiment.
Figure 14:
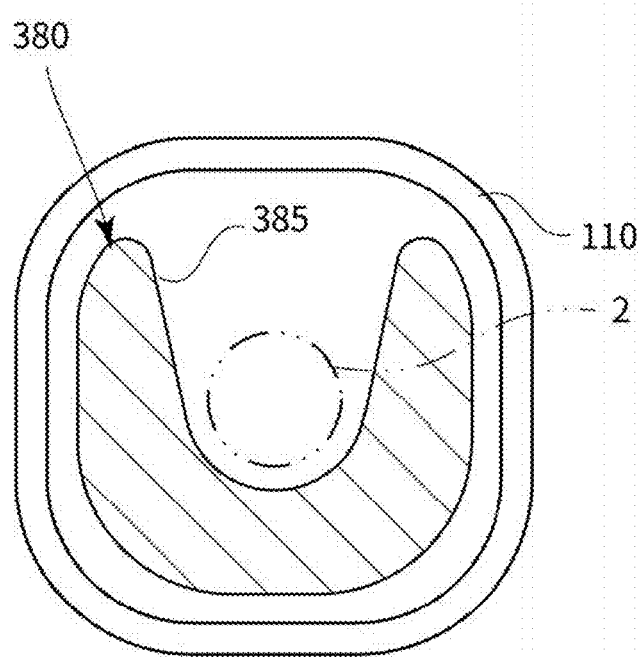
FIG. 14 is a view illustrating another example of the PTC thermistor having a shape different from the present embodiment.

FIG. 13 is a view illustrating an example of a PTC thermistor having a shape different from the present embodiment. FIG. 14 is a view illustrating another example of a PTC thermistor having a shape different from the present embodiment.

In FIGS. 13 and 14, PTC thermistors 280 and 380 and the holder 110 in which they are arranged are schematically illustrated, seen from the rotary shaft direction. A two-dot chain line indicates an area overlapped with a rotary shaft 2 of the motor body 1c.

As illustrated in FIG. 13, the PTC thermistor 280 having a hole part 285 through which the rotary shaft 2 of the motor 1 passes may be used.

Moreover, as illustrated in FIG. 14, the PTC thermistor 380 having an outer peripheral edge shape 385 recessed to avoid the rotary shaft 2 of the motor 1 may be used. The shape recessed to avoid the rotary shaft 2 is not limited to that seen in the illustration, but can be set as appropriate.

As described above, the shape of the PTC thermistor can be set in various ways in accordance with the shape of the holder 110. By setting the hole part 285 or the outer peripheral edge shape 385 on the PTC thermistor so as to avoid the rotary shaft 2, the PTC thermistor can be arranged closer to rotary shaft 2 or bearings supporting it and the like. Therefore, a large-sized PTC thermistor can be arranged closer to the motor body, and the size of the motor can be reduced.

[Others]

In the embodiment described above, some characteristics do not have to be provided or some characteristics may be constituted in another form.

The outer peripheral shape of the external unit may be different from the outer peripheral shape of the motor body. The external unit may have an outer peripheral shape larger than the outer peripheral shape of the motor body in the perpendicular direction with respect to the rotary shaft direction or may have a smaller outer peripheral shape.

As a circuit element mounted on the external unit, a circuit element such as a choke coil and the like may be provided in addition to the PTC thermistor. Moreover, instead of the PTC thermistor, another circuit element may be arranged on the power feed line to the motor.

The number of the motor terminals of the motor body is not limited to two but may be larger than two. The external unit need only have a constitution in which the PTC thermistor is arranged between the first terminal, a part of which is exposed to the outside of the holder and the second terminal connected to one of the motor terminals of the motor body and does not have to have a terminal connected to another motor terminal. In this case, by applying a voltage to the first terminal and another motor terminal from outside of the motor, power can be fed to the motor.

The motor constituted as above can be used for various applications. For example, it can be used for an electronic device or may be used for applications mounted on various vehicles.

The embodiment described above is exemplification in all the points and should not be considered to be limiting. A scope of the present disclosure is illustrated not by the explanation described above but by a scope of claims, and meanings equivalent to the scope of claims and all the changes within the scope are intended to be included.

What is claimed is:

1. An external unit used by being mounted on a bottom part of a motor body having at least two motor terminals, comprising:
    a holder;
    a PTC thermistor arranged on the holder;
    a first terminal connected to the PTC thermistor, a part of the first terminal being exposed to an outside of the holder; and
    a second terminal electrically connected to the first terminal through the PTC thermistor and electrically connected to one of the motor terminals, wherein
    the PTC thermistor is disposed between the first terminal and the second terminal,
    the one of the motor terminals is arranged on the bottom part side of the motor body,
    the second terminal includes an engaging means,
    the engaging means is engaged with an engaged part provided at the one of the motor terminals, and
    the engaging means is engaged with the engaged part, thereby the second terminal is electrically connected to the motor terminal.

2. The external unit according to claim 1, wherein
    the second terminal is fixed to the holder; and
    the second terminal has a pressing means in contact with the surface of the PTC thermistor, and the pressing means presses the PTC thermistor onto the holder.

3. The external unit according to claim 2, wherein
    the PTC thermistor has electrode plates on both surfaces;
    the pressing means is in contact with one of the electrode plates; and
    the PTC thermistor is pressed onto the holder by the pressing means, thereby the first terminal is in contact with another of the electrode plates.

4. The external unit according to claim 1, wherein
the holder has an opening facing the surface of the PTC thermistor; and
an outside of the holder and an inside of the holder are connected through the opening.

5. The external unit according to claim 1, wherein
the PTC thermistor has an outer peripheral edge shape recessed to avoid the rotary shaft of the motor or a hole part through which the rotary shaft of the motor passes.

6. The external unit according to claim 1, wherein
the second terminal is formed so as to have flexibility.

7. The external unit according to claim 1, wherein
the holder has a wall facing a side surface of the PTC thermistor; and
the first terminal or the second terminal faces the side surface of the PTC thermistor across the wall.

8. An external unit used by being mounted on a bottom part of a motor body having at least two motor terminals, comprising:
a holder;
a circuit element arranged on the holder;
a first terminal connected to the circuit element, a part of the first terminal being exposed to an outside of the holder; and
a second terminal electrically connected to the first terminal through the circuit element and electrically connected to one of the motor terminals, wherein
the circuit element is disposed between the first terminal and the second terminal,
the one of the motor terminals is arranged on the bottom part side of the motor body,
the second terminal includes an engaging means,
the engaging means is engaged with an engaged part provided at the one of the motor terminals, and
the engaging means is engaged with the engaged part, thereby the second terminal is electrically connected to the motor terminal.

9. A motor, comprising:
a motor body having at least two motor terminals; and
an external unit used by being mounted on a bottom part of the motor body, wherein
the external unit comprises:
a holder;
a PTC thermistor arranged on the holder;
a first terminal connected to the PTC thermistor, a part of the first terminal being exposed to an outside of the holder; and
a second terminal electrically connected to the first terminal through the PTC thermistor and electrically connected to one of the motor terminals, wherein
the PTC thermistor is disposed between the first terminal and the second terminal,
the one of the motor terminals is arranged on the bottom part side of the motor body,
the second terminal includes an engaging means,
the engaging means is engaged with an engaged part provided at the one of the motor terminals, and
the engaging means is engaged with the engaged part, thereby the second terminal is electrically connected to the motor terminal.

10. The external unit according to claim 8, wherein
the PTC thermistor is flat-plate shaped; and
a surface of the PTC thermistor is directed toward a rotary shaft direction of the motor.

11. The external unit according to claim 8, wherein
the circuit element is flat-plate shaped; and
the surface of the circuit element is directed toward a rotary shaft direction of the motor.

12. The motor according to claim 9, wherein
the PTC thermistor is flat-plate shaped,
a surface of the PTC thermistor is directed toward a rotary shaft direction of the motor.

\* \* \* \* \*